Aug. 18, 1925.
C. H. STOODY ET AL
1,550,229
ELECTRODE HOLDER
Filed July 19, 1924
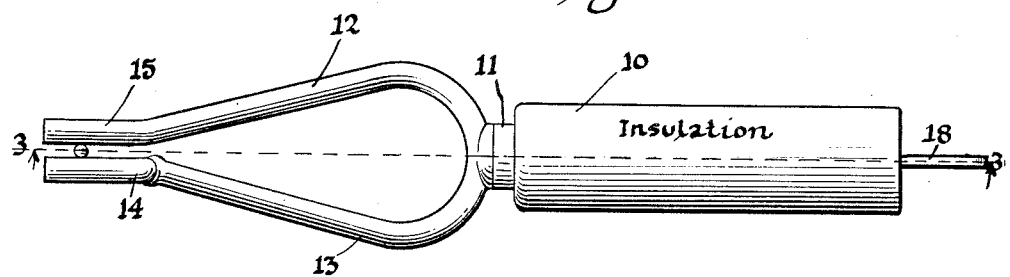
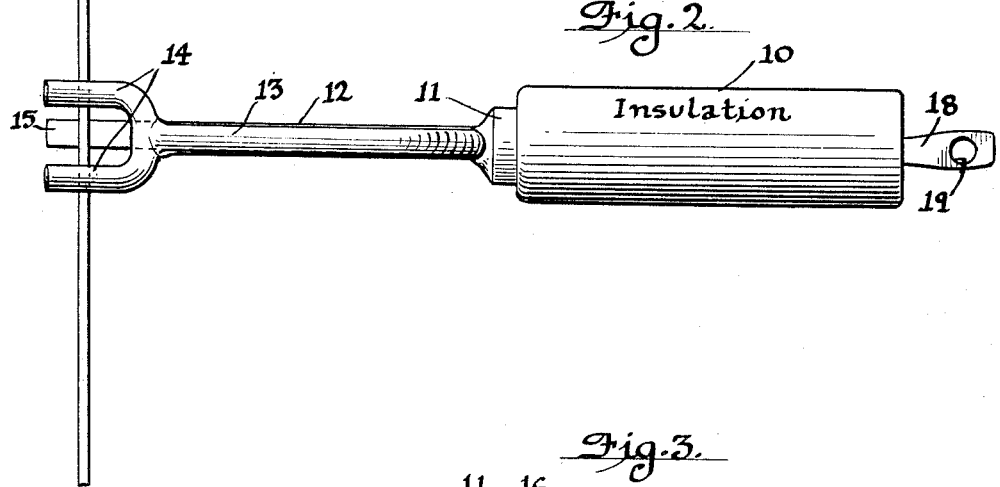
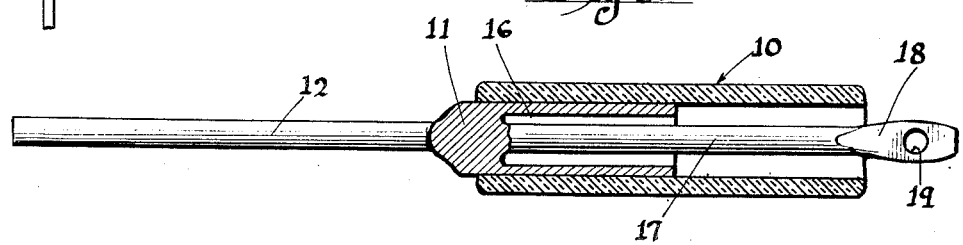

Patented Aug. 18, 1925.

1,550,229

UNITED STATES PATENT OFFICE.

CHARLES H. STOODY, SHELLEY M. STOODY, AND WINSTON F. STOODY, OF WHITTIER, CALIFORNIA.

ELECTRODE HOLDER.

Application filed July 19, 1924. Serial No. 726,979.

*To all whom it may concern:*

Be it known that we, CHARLES H. STOODY, SHELLEY M. STOODY, and WINSTON F. STOODY, citizens of the United States, residing at Whittier, in the county of Los Angeles and State of California, have invented new and useful Improvements in Electrode Holders, of which the following is a specification.

This invention relates to electrical welding.

It is an object of this invention to provide an improved electrode holder which is provided with means for engaging a welding stick at three places.

It is another object of this invention to provide a suitable electrode holder with a handle and a clamp for engaging a welding stick secured to the handle and with means extending through the handle for connecting to an electrical conduit.

It is a further object of this invention to provide a cheap, simple, durable and efficient holder for grasping an electrode.

With the above objects in view, reference is had to the accompanying drawings for an illustrative embodiment of the invention, wherein:

Figure 1 is a top plan view of the improved holder,

Fig. 2 is a side elevation of the holder shown in Fig. 1, and

Fig. 3 is a vertical section taken substantially on the line 3—3 of Fig. 1.

Referring to the accompanying drawings wherein similar reference characters designate similar parts, a tubular handle 10, which is formed of insulative material such as hard rubber, or its equivalent, has secured thereto a suitable shank 11, which is inserted within the body of the handle 10, as clearly shown in Fig. 3. A pair of arms 12 and 13 are formed integral with the shank 11, and are outwardly converging, as shown in Fig. 1. The arm 13 has near its extremity a U-shaped extension 14 which is secured to the arm 13 either by welding or may be formed integral therewith. The end of the arm 12 is bent so as to be parallel with the axis of the holder, as at 15, and this end 15 is adapted to cooperate with the U-shaped extension 14 of the arm 13 to ridigly hold a welding stick W. It is seen that the arms 12 and 13 are provided with means for engaging the welding stick at three places.

The shank 11 is hollowed out, as at 16, and a conductor 17, which is formed integral with the shank 11, extends therethrough to the opposite end of the handle 10, at which point it is flattened, as at 18, and is provided with an aperture 19 for securing the holder to an electrical conduit. By making the body of the work (not shown) one electrode and connecting the conductor 17 to an electrical conduit, the welding stick W is made the other electrode, which enables the welding to be done with great facility.

The arms 12 and 13 are resilient and normally the end 15 is held between the U-shaped extension 14 so that when the welding stick W is inserted therebetween, it is resiliently clamped by the arms 12 and 13.

It will be noted that the members or forks 14 upon the improved electrode holder are spaced apart and are arranged upon opposite sides of the portion 15. By this construction, the welding stick W may be readily inserted by placing the end of the stick between the portion 15 and one of the legs or members 14, and by using the welding stick as a lever, the arms 12 and 13 may be forcibly separated to allow the welding stick W to be clamped between both of the members 14 and the portion 15. In such operation, it is possible to separate the arms 12 and 13 a sufficient distance which is greater than the thickness of the welding stick W, so that the remaining portion of an old welding stick can be dropped from between the engaging portions of the electrode holder. In this manner, two operations may be simultaneously performed quite easily, namely, inserting a new welding stick or electrode and at the same time removing the old welding stick.

It is to be understood that the drawings and the above description are used for illustrative purposes only and that various changes in the detail of construction may be made without departing from the spirit of the invention or in scope as defined by the appended claims.

We claim:

1. An electrode holder having two resilient arms, one of which is forked.

2. An electrode holder having an arm adapted to bear upon one side of an electrode and two other members adapted to bear upon the opposite side of the electrode, said members having an opening therebetween and being arranged upon opposite sides of said arm.

3. An electrode holder having two resilient arms, one of which is provided with a U-shaped extension.

4. An electrode holder comprising a handle, a pair of converging resilient arms secured to said handle, one of said arms having a fork extension adapted to cooperate with the other arm to engage a welding stick at three places.

5. An electrode holder comprising a handle, a pair of converging resilient arms secured to said handle, one of said arms having a fork extension adapted to cooperate with the other arm to engage a welding stick at three places, and means extending through said handle for connecting said arms to an electrical conduit.

In testimony whereof we have signed our names to this specification.

C. H. STOODY.
SHELLEY M. STOODY.
WINSTON F. STOODY.